(No Model.)
G. L. HINDERER.
HEATER FOR FOOD, &c.
No. 481,759.　　　　　　　Patented Aug. 30, 1892.
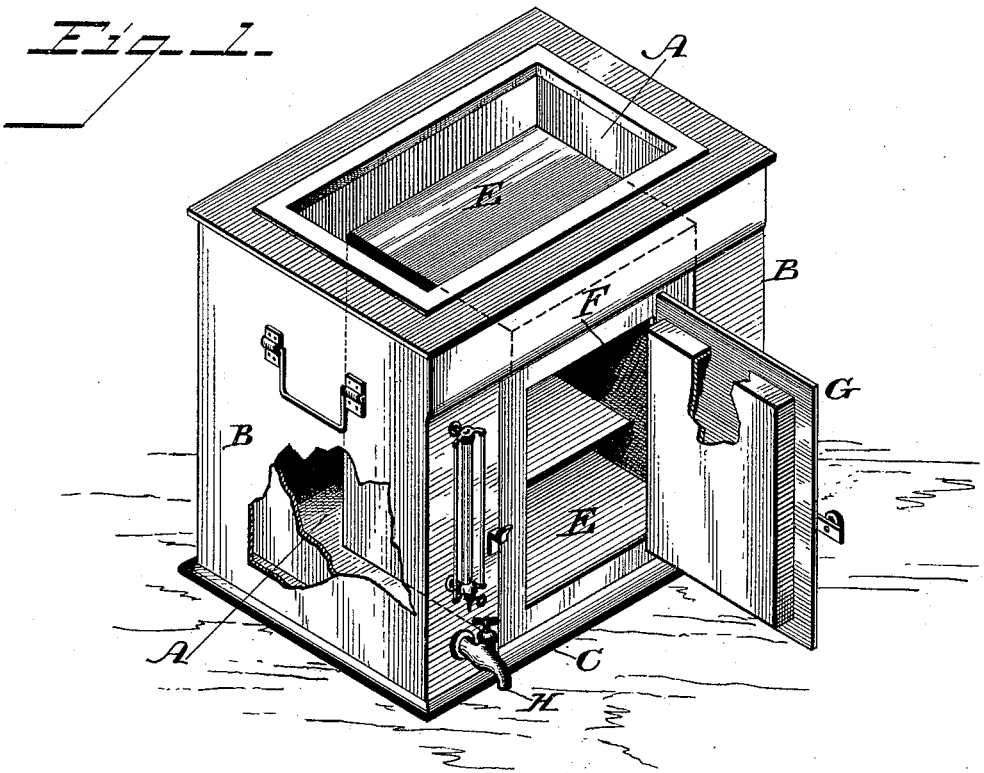
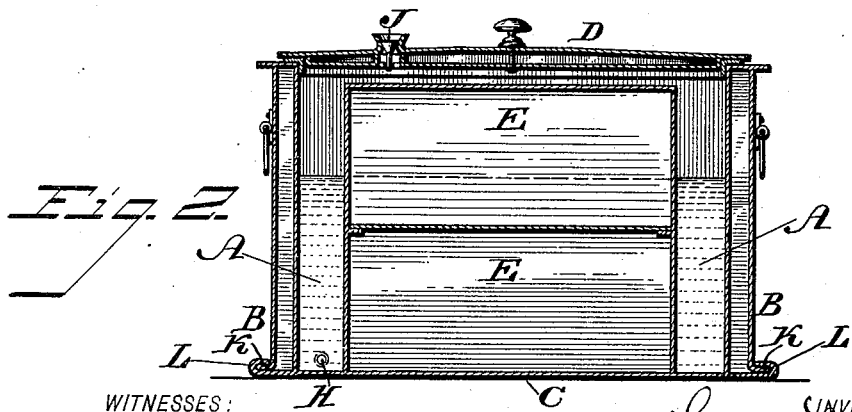
WITNESSES:
L. Douville
P. H. Nagle
INVENTOR
Gustav L. Hinderer.
BY John A. Wiedersheim
ATTORNEY.

UNITED STATES PATENT OFFICE.

GUSTAV L. HINDERER, OF PHILADELPHIA, PENNSYLVANIA.

HEATER FOR FOOD, &c.

SPECIFICATION forming part of Letters Patent No. 481,759, dated August 30, 1892.

Application filed April 25, 1892. Serial No. 430,444. (No model.)

*To all whom it may concern:*

Be it known that I, GUSTAV L. HINDERER, a citizen of the United States, residing in the city and county of Philadelphia, State of Pennsylvania, have invented a new and useful Improvement in Heaters for Food, &c., which improvement is fully set forth in the following specification and accompanying drawings.

My invention consists of a heater for food, dishes, &c., formed of a heating-chamber with a water-reservoir around the same, as will be hereinafter set forth and definitely claimed.

Figure 1 represents a perspective view of a heater embodying my invention. Fig. 2 represents a longitudinal vertical section thereof.

Similar letters of reference indicate corresponding parts in the two figures.

Referring to the drawings, A designates a water-reservoir formed of a metallic casing with preferably double side walls B, a bottom C, and a lid D with an air-space therein.

In the reservoir is a metallic oven or chamber E, which is tightly closed on the top, sides, and back, and it joins the front wall of the reservoir aside of the opening F therein, where access is had to said chamber in order to insert and remove food, dishes, &c., into and therefrom, said opening being closed by a suitable door G.

Between the top wall of the chamber E and the bottom of the lid D is an air-space, so that said chamber has surrounding it on all sides an open space, except on the bottom thereof.

The operation is as follows: Water is placed in the reservoir A and the device placed upon a stove, range, &c., whereby the water may be heated, or if previously hot the heat may be maintained. This heats the chamber E, whereby articles therein may be warmed or heated and kept so, and the device may be placed in a dining-room, saloon, &c., so that the articles as required may be removed therefrom, or the device may be used for "sending out" meals, &c.—a matter of convenience and service—as the chamber retains its heat as long as the water remains hot or warm, it being noticed that the water is not exposed to the atmosphere, so that its rapid cooling is prevented. Besides this there is a supply of hot water when so required, the same being readily drawn off by the faucet H, which is suitably connected with one of the walls of the reservoir.

In the lid D is an automatically-acting valve J, which opens outwardly to permit the escape of steam in the reservoir A when the same is excessive, thus preventing explosion. The bottom C is extended beyond the sides B, and the latter are flanged outwardly, as at K, the flanges being embraced by the extended ends of the bottom, which ends are bent over the flanges, thus forming lap-joints L, which firmly connect the bottom and sides, as most clearly shown in Fig. 2.

Having thus described my invention, what I claim as new, and desire to secure by Letters Patent, is—

1. A heater having a water-reservoir with double side walls and a lid, a heating-chamber within said reservoir, having an open space on its sides and top, and a door connected with the side of the reservoir and opening into said chamber, said parts being combined substantially as described.

2. A heater consisting of a water-reservoir having the double side walls B, the bottom C, and the lid D, the metallic chamber E within said reservoir, with the opening F therein, having the door G, opening outside the reservoir, and the faucet H, leading from the said reservoir, said lid D having a valve for the escape of the steam, said parts being combined substantially as described.

GUSTAV L. HINDERER.

Witnesses:
JOHN A. WIEDERSHEIM,
WM. C. WIEDERSHEIM.